United States Patent
Samdani et al.

(10) Patent No.: US 11,082,813 B2
(45) Date of Patent: Aug. 3, 2021

(54) MESSAGE-BASED MANAGEMENT SERVICE ENROLLMENT

(71) Applicant: VMware, Inc., Palo Alto, CA (US)

(72) Inventors: Azhar Faiz Samdani, Bangalore (IN); Subhrajit Bhowmik, Bangalore (IN); Anantha Raman B R, Bangalore (IN); Bhyruva S Gangadharaiah, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/781,046

(22) Filed: Feb. 4, 2020

(65) Prior Publication Data

US 2020/0178046 A1    Jun. 4, 2020

Related U.S. Application Data

(63) Continuation of application No. 16/193,393, filed on Nov. 16, 2018, now Pat. No. 10,582,348, which is a continuation of application No. 15/496,255, filed on Apr. 25, 2017, now Pat. No. 10,158,982.

(51) Int. Cl.
| | |
|---|---|
| *H04W 4/14* | (2009.01) |
| *H04L 12/58* | (2006.01) |
| *H04L 29/08* | (2006.01) |
| *H04L 29/06* | (2006.01) |
| *H04W 12/06* | (2021.01) |

(52) U.S. Cl.
CPC .............. *H04W 4/14* (2013.01); *H04L 51/04* (2013.01); *H04L 51/046* (2013.01); *H04L 51/28* (2013.01); *H04L 63/08* (2013.01); *H04L 67/16* (2013.01); *H04W 12/06* (2013.01)

(58) Field of Classification Search
CPC ....... H04L 51/04; H04L 51/046; H04L 51/28; H04L 63/08; H04L 67/16; H04W 12/06; H04W 4/14; H04W 12/00514; H04M 2203/6045; H04M 3/42
See application file for complete search history.

(56) References Cited

U.S. PATENT DOCUMENTS

| | | |
|---|---|---|
| 2004/0248547 A1 | 12/2004 | Philsgard et al. |
| 2008/0134343 A1 | 6/2008 | Pennington et al. |
| 2011/0072114 A1* | 3/2011 | Hoffert ............... G06F 16/9577 709/219 |
| 2012/0253852 A1 | 10/2012 | Pourfallah et al. |
| 2012/0264427 A1* | 10/2012 | Adatia .................... H04W 4/14 455/435.1 |
| 2014/0266594 A1* | 9/2014 | Reiser ................. G06F 3/04842 340/5.72 |
| 2015/0066766 A1 | 3/2015 | Wittenburg et al. |
| 2015/0278810 A1 | 10/2015 | Ramatchandirane et al. |
| 2017/0094079 A1 | 3/2017 | Watanabe et al. |
| 2017/0331799 A1 | 11/2017 | Uchiyama |
| 2017/0353436 A1 | 12/2017 | Jurss et al. |
| 2018/0167371 A1 | 6/2018 | Gordon et al. |

* cited by examiner

*Primary Examiner* — Quoc Thai N Vu
(74) *Attorney, Agent, or Firm* — Thomas Horstemeyer, LLP

(57) ABSTRACT

Disclosed are various examples for message-based management service enrollment. In some examples, an enrollment application obtains a user-entered number. A unique device identifier and a device communication identifier are identified and transmitted to an enrollment service using the user-entered number. Enrollment data is received at the client device, and the client device enrolls with a management service using the enrollment data.

20 Claims, 7 Drawing Sheets

MESSAGE-BASED MANAGEMENT SERVICE ENROLLMENT

CROSS REFERENCE TO RELATED APPLICATIONS

The present application is a continuation of co-pending U.S. patent application Ser. No. 16/193,393, filed on Nov. 16, 2018 and entitled "Message-Based Management Service Enrollment," which is a continuation of U.S. patent application Ser. No. 15/496,255, filed on Apr. 25, 2017 and entitled "Message-Based Management Service Enrollment," all of which are hereby incorporated herein by reference in their entireties. The present application claims priority to and the benefit of each of the foregoing applications.

BACKGROUND

An enterprise can share resources with employees, non-employees, contractors, and anonymous users. Sharing resources such as network access profiles, applications, videos, and documents can be difficult to arrange and might be insecure. Sharing WiFi profiles can require information to be sent to or personally communicated with each user. Document resources can be shared by providing a link to document resources, but these resources may become public if available without a password. Sharing passwords to secured resources can be difficult.

To this end, an enterprise can use a management service to provide users with secure access to resources through their client devices. However, a client device might be required to be enrolled with the management service before these resources are accessible, and the enrollment process can be difficult to complete. Some enterprises have departments or teams dedicated to helping users complete enrollment processes. User information or client device information can be required by a management service to complete the enrollment process. An enterprise may not be capable of providing user information or client device information for some users that they wish to enroll, including anonymous users, walk-up customers, and temporary employees. Moreover, enterprise managers may not desire to compile this information. Users may not know how to identify client device information that is necessary for enrollment. Current management service enrollment processes can frustrate enterprise managers and users alike.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to message-based management service enrollment. An enterprise can use a management service to provide users with resources like network access profiles, applications, videos, and documents. An enterprise can share resources with employees as well as non-employees and anonymous users. A client device might be required to enroll with the management service as a managed device before these resources are accessible. Enrollment into a management service can be difficult. Employees and anonymous users alike may not know how to complete an enrollment process. However, examples described include an enrollment service that can have mechanisms capable of guiding management service enrollment using a message-based enrollment process. These message-based management service enrollment can support enrollment for enterprise employees, non-employees, and anonymous users.

Figure 1:
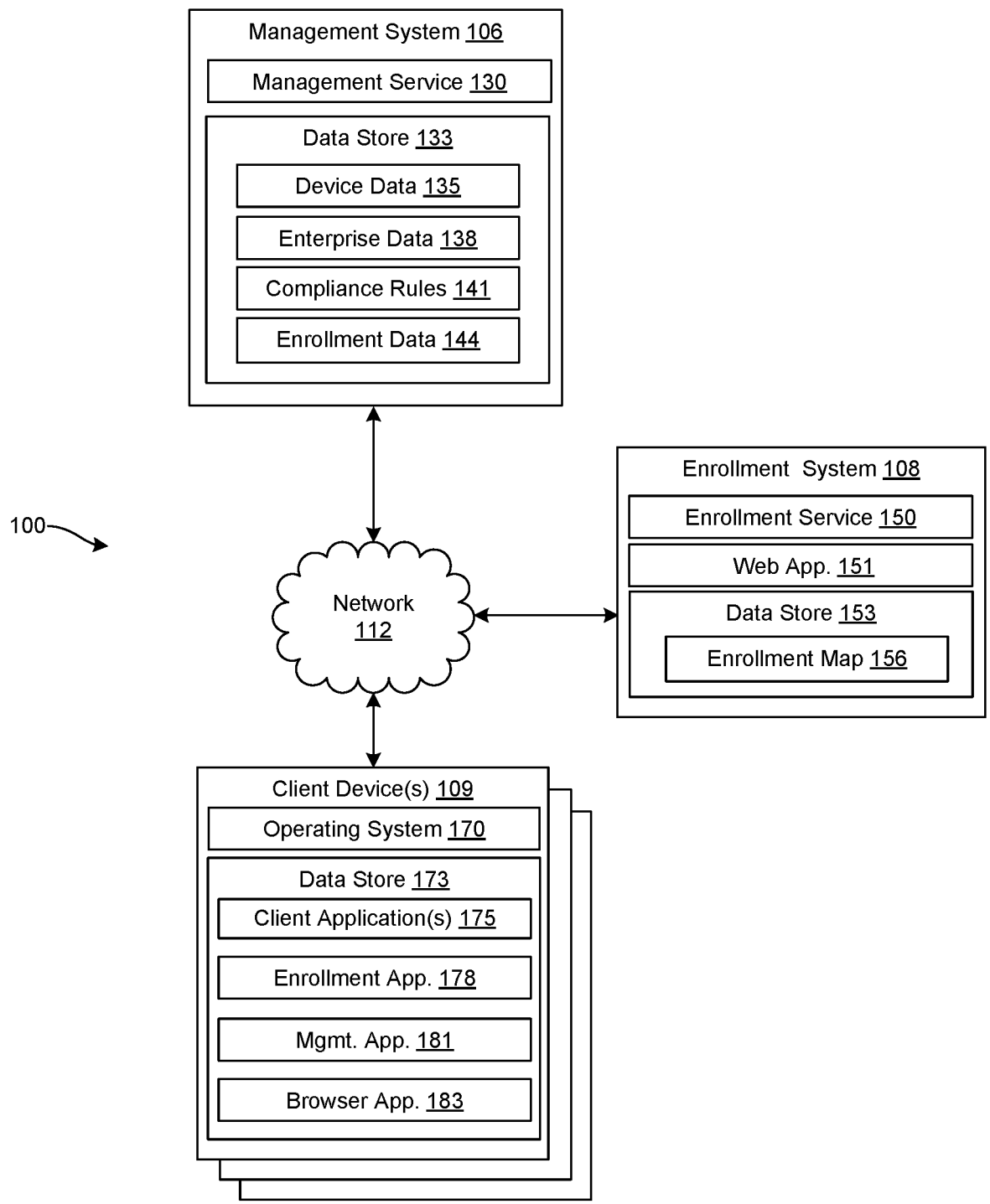
FIG. 1 is a drawing of an example of a networked environment including an enrollment system, a management system, and a client device.

With reference to FIG. 1, shown is an example of a networked environment 100. The networked environment 100 can include a management system 106, an enrollment system 108, and a client device 109 in communication with one another over a network 112. A user can enroll the client device 109 with the management system 106 using the enrollment system 108.

The network 112 can include, for example, the Internet, intranets, extranets, wide area networks (WANs), local area networks (LANs), wired networks, wireless networks, other suitable networks, or any combination of two or more networks. For example, the networks can include satellite networks, cable networks, Ethernet networks, cellular networks, short message system (SMS) gateways, telephony networks, and other types of networks.

The management system 106 can include, for example, a server computer or any other system providing computing capability. Alternatively, the management system 106 can include a plurality of computing devices that are arranged, for example, in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to in the singular. Even though the management system 106 is referred to in the singular, it is understood that a plurality of management systems 106 can be used in the various arrangements as described above. As the management system 106 communicates with the client device 109 remotely over the network 112, the management system 106 can be described as a remote management system 106 or a collection of one or more remote computing devices.

The components executed on the management system 106 can include, for example, a management service 130 as well as other applications, services, processes, systems, engines, or functionality not discussed in detail. The management system 106 can execute the management service 130 to oversee the management of the client devices 109. The management service 130 can provide functionality using application program interfaces (APIs). The management service 130 can oversee the operation of client devices 109 enrolled with the management service 130 as well as manage enrollment and un-enrollment operations of the client devices 109. To this end, an API of the management service 130 can provide enrollment information regarding a client device 109, such as whether the client device 109 is enrolled with the management service 130. APIs or API calls can be provided for other functionalities of the management service as discussed. In some embodiments, an enterprise, such as one or more companies or other organizations, can operate the management service 130 to oversee or manage the operation of the client devices 109 of its employees, contractors, customers, students, or other users having user accounts in a directory associated with the enterprise. An enterprise can be any customer of the management service 130. The directory can use MICROSOFT® Active Directory, Lightweight Directory Access Protocol (LDAP), VMWARE® Socialcast, and other directory services. The directory can be maintained by the management service 130. The directory can be part of the management service 130, or can be separate from the management service 130.

The data store 133 can include memory of the management system 106, mass storage resources of the management system 106, or any other storage resources on which data can be stored by the management system 106. The data stored in the data store 133 can include, for example, management data including device data 135, enterprise data 138, compliance rules 141, and enrollment data 144, as well as other data.

Generally, device data 135 can include data associated with a configuration of a client device 109 enrolled or managed by the management service 130. The device data 135 can include an identifier of the client device 109. The client devices 109 can be identified within the device data 135 by a device identifier, a unique device identifier (UDID), a media access control (MAC) address, an internet protocol (IP) address, or another identifier that uniquely identifies a client device 109 with respect to other client devices 109. The device data 135 can also identify user information like a name (e.g., first name and last name), a username, and/or an email address associated with a user of the client device 109. In addition, the device data 135 can include an enrollment status indicating whether a client device 109 is enrolled with the management service 130. In one example, a client device 109 designated as "enrolled" can be permitted to access the enterprise data 138 while a client device 109 designated as "not enrolled," or having no designation, can be denied access to the enterprise data 138.

Additionally, device data 135 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 135 can also include data pertaining to user groups. An administrator can specify one or more of the client devices 109 as belonging to a user group. The management service 130 can enroll a client device 109 as belonging to a particular user group. User groups can be created by an administrator of the management service 130 so that a batch of client devices 109 can be configured according to common settings. For instance, an enterprise can create a user group for the marketing department and the sales department, where the client devices 109 in the marketing department are configured differently from the client devices 109 in the sales department.

Compliance rules 141 can include, for example, configurable criteria that must be satisfied for an enrolled one of the client devices 109 to be "in compliance" with the management service 130. The compliance rules can be based on a number of factors including geographical location of the client device 109, activation status, enrollment status, authentication data including authentication data obtained by a device registration system, time, and date, and network properties, among other factors. The compliance rules can also be determined based on a user profile associated with a user. The user profile can be identified by obtaining authentication data associated with the client device 109. The user profile can be associated with compliance rules that are further determined based on time, date, geographical location and network properties detected by the client device 109. The user profile can further be associated with a user group, and compliance rules can be determined in view of the user group.

Compliance rules 141 can include predefined constraints that must be met in order for the management service 130, or other applications, to permit access to the enterprise data 138 or other features of the client device 109. In some examples, the management service 130 communicates with a management application, an enrollment application, or another client application 175 executable on the client device 109 to determine whether states exist on the client device 109 that do not satisfy one or more compliance rules 141. Some of these states can include, for example, a virus or malware being detected on the client device 109, installation or execution of a blacklisted client application 175, or a client device 109 being "rooted" or "jailbroken," where root access is provided to a user of the client device 109. Additional states can include the presence of particular files, questionable device configurations, vulnerable versions of client applications 175, or other vulnerability, as can be appreciated.

Enrollment data 144 can include information that can be used to enroll a client device 109 with the management service 130. The enrollment data 144 can include an enrollment token like a value, parameter, or file that can be used to authenticate the client device 109 with the management service 130. In some cases, an enrollment token can be included in a link for enrollment that can be sent to a client device 109. In some cases, the management service 130 can provide enrollment tokens corresponding to each of the client devices 109 and/or users that have a user account with the enterprise. To this end, a request for an enrollment token can be required to include a device identifier, username, password, or other information. While the enrollment token can be used to enroll the client device 109, in some cases it can be requested from another device, like the enrollment system 108. The enrollment system 108 can then provide the enrollment token to the client device 109. An enrollment token can be valid during a certain time period after which the enrollment token can expire. The enrollment data 144 can be considered part of the compliance rules 141 and can be determined based on device identifier, time, date, geographical location and network properties like the compliance rules 141.

Enrollment data 144 can also include a network address or other information to facilitate communication between the client device 109 and the management service 130. Further, the enrollment data 144 can include an enrollment link, or a link to a network site that allows the client device 109 to enroll with the management service 130. Enrollment data 144 can also include a network resource address and other instructions for communications with the management service 130, for example, to utilize an API of the management service 130. To this end, the management service 130 can include the network site and generate a link to the network site to include in the enrollment data 144. While the enrollment data 144 is shown in the data store 133, it can also be transmitted to the enrollment system 108 and stored in the data store 153, and transmitted to the client device 109 and stored in the data store 173.

In some embodiments, an enterprise can operate the management service 130 to oversee or manage the operation of the client devices 109 of its employees, contractors, customers, students, or other users having user accounts with the enterprise. The management service 130 can remotely configure the client device 109 by interacting with an agent application, an enrollment application 178, a management application 181, or another client application 175 executed on the client device 109.

The management service 130 can transmit various software components to the client device 109, which can be installed or configured by the management application 181. Software components can include, for example, additional client applications 175, resources, libraries, drivers, device configurations, or other similar components that require installation on the client device 109 as specified by an administrator of the management service 130. The management service 130 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. These policies can be implemented by the management application 181.

The management service 130 can have a command queue storing at least one action to perform on the particular client device 109 upon check-in of the client device 109. For instance, the management application 181 can cause the client device 109 to check-in with the management service, identify an action in the command queue, and perform the action. An action can be the installation of a profile, or the execution of a command or other actions to install software components or implement policies. In some cases, the management application 181 can cause a check-in of the client device 109 periodically, on a schedule, or upon an event such as entering a physical location, changing a state of the client device 109, or installing an application on the client device 109. In one example, the contents of the command queue can include a command that the management application 181 causes to be executed on the client device 109. In another example, the contents of the command queue can include a resource or a client application 175 that the management application 181 causes to be installed on the client device 109, which the client device 109 may access through a specified uniform resource identifier (URI) or uniform resource locator (URL).

Also, the management service 130 can request that the client device 109 check-in using a notification service like APPLE® Push Notification Service (APNS), GOOGLE® Cloud Messaging (GCM), or WINDOWS® Push Notification Services (WNS). For example, the management service 130 can transmit a request to the notification service requesting that the client device 109 check-in. The notification service can push or otherwise route a notification to the client device 109. Once the notification is received, the management application 181 can cause the client device 109 to check-in with the management service 130. As described above, the management application 181 can determine whether a command queue provided by the management service 130 for the respective client device 109 contains any commands or resources for the client device 109, and, if so, can cause the commands or resources to be downloaded and/or implemented on the client device 109.

The enrollment system 108 can include, for example, a server computer or any other system providing computing capability as described regarding the management system 106. Even though the enrollment system 108 is referred to in the singular, it is understood that a plurality of enrollment system 108 can be used in the various arrangements as described above. As the enrollment system 108 communicates with the client device 109 remotely over the network 112, the enrollment system 108 can be described as a remote enrollment system 108 or a collection of one or more remote computing devices. In some cases the enrollment system 108 can be part of the management system 106.

The components executed on the enrollment system 108 can include, for example, an enrollment service 150 as well as other applications, services, processes, systems, engines, or functionality not discussed in detail. The enrollment service 150 can oversee the enrollment of the client device 109 with the management service 130. In some instances, the enrollment service 150 can include a web application 151 that can be accessed by the client device 109 through the network 112 to perform functionality related to enrollment with the management service 130. The enrollment service 150, the web application 151, and instructions for other functionality can in some instances be stored in a data store 153 of the enrollment system 108. The data store 153 can include memory of the enrollment system 108, mass storage resources of the enrollment system 108, or any other storage resources on which data can be stored by the enrollment system 108. In some cases, the enrollment service 150 and the web application 151 can be a part of the management service 130, and in other cases the enrollment service 150 and the web application 151 can be implemented as logic or an application that is separate from a management service. The web application 151 can be a network site that is accessed by the client device 109 through the browser application 183 or another client application 175.

The data stored in the data store 153 can be associated with the operation of the various applications and/or functional entities described below. The data store 153 can also store enrollment map 156 for use in enrolling the client device 109 with the management system 106. The enrollment map 156 can be a file, list, table, logic, or other data that associates a number or another communication identifier with the enterprise and/or user group. When the enrollment service 150 receives a message that is sent using a particular number or communication identifier, the enrollment service 156 can search the enrollment map 156 for data associated with the particular number. The enrollment map 156 can include a URI or server address that can be used to enroll the client device 109 in association with the enterprise or a user group within the management service 130. The enrollment map 156 can include a group identifier or enterprise identifier that is recognizable by the management service 130 during user account creation. The enterprise identifier can be an alphanumeric or character string that uniquely identifies the enterprise. The group identifier can be an alphanumeric or character string that uniquely identifies a user group. For example, the enrollment service 150 can receive a message from a number, and can search the enrollment map to identify a URI, group identifier, an enterprise identifier and other information within the enrollment map 156 that can be used to enroll the client device 109 within the management service 130. The enrollment map 156 can be generated and stored by the enrollment service 150.

The number can be a long code, short code, direct inward dialing (DID) number, mobile station international subscriber directory number (MSISDN), toll-free phone number, or another number that identifies a telephonic endpoint, instant messaging endpoint, email endpoint, or another network endpoint of the enrollment service 150. The enrollment service 150 can receive messages that are sent to the number. The number can be selected from a plurality of numbers provided by an SMS gateway that can be made available to the enrollment service 150 for enrollment of client device 109 that message the number. The number can be considered a communication identifier. The communication identifier can identify an instant messaging endpoint, email endpoint, telephonic endpoint, or another network endpoint of the enrollment service 150. The communication identifier can include an email address, a username, or another alphanumeric or character string. The enrollment service 150 can receive the message through text message, email, instant message, or another message service. In some cases the enrollment service 150 can provide an API that the client device 109 can invoke through a request that includes the number or other communication identifier.

The enrollment service 150 can generate a username using client data including a device identifier and a device number of the client device 109. The enrollment service 150 can generate the username by arranging the device identifier and the device number one after the other, or scrambling the characters of the device identifier and the device number in any order. The enrollment service 150 can encrypt the device identifier and the device number into an alphanumeric or character string, for example, using a cryptographic algorithm or a key. The client device 109 can transmit a message including client data to the enrollment service 150 using the number.

For example, the enrollment service 150 can receive the device identifier and the device number in a message transmitted from a client device 109 to the number. The device number can be a long code, short code, direct inward dialing (DID) number, mobile station international subscriber directory number (MSISDN), toll-free phone number, or another number that identifies a network endpoint of the client device 109. The client device 109 can receive messages using the number. The device number can be considered a device communication identifier. Other device communication identifiers can include a username, an email address, or another alphanumeric or character string. The device communication identifier can identify an instant messaging endpoint, email endpoint, telephonic endpoint, or another network endpoint associated with the client device 109. For example, messages that are sent using the device communication identifier can be received by the enrollment application 178 on the client device 109.

Once the message is received, the enrollment service 150 can identify the enterprise in the enrollment map 156 using the number or other device communication identifier. The enrollment service 150 can transmit a request to create a user account associated with the enterprise within the management service 130. The request for account creation can include the username, the device number, the device identifier, an enterprise identifier, a group identifier, or other information. The request can cause the management service 130 to create a user account. The user account can be created using the username, the device number, the device identifier, and other information. The user account can be associated with an enterprise or group corresponding to the enterprise identifier or group identifier. In some cases, the user account can be associated with an enterprise or group corresponding to a URI that is utilized when transmitting the request. The enrollment service 150 can also transmit a request for an enrollment token and other enrollment data 144 to the management service 130. The request for the enrollment data 144 can include the device identifier, the username, or other information. The enrollment service 150 can receive enrollment data 144 from the management service in response to the request. Once received, the enrollment service 150 can store the enrollment data in a temporary record or otherwise in the data store 153.

The enrollment service 150 can transmit a message to the client device 109 using the device number. For example, the message can be an SMS message that includes the enrollment data. Alternatively, an instant message can be used through a data network. In some cases, the enrollment service 150 can initially attempt to use an instant message, and can use an SMS message if the instant message is not successful. For example, the instant message can be unsuccessful if the data network is not available to the client device 109. The enrollment data 144 can be used for enrollment of the client device 109 with the management service 130. The enrollment data 144 can include an enrollment token that authenticates the client device 109 with the management service 130 during the enrollment process.

The enrollment service 150 can also provide a network site for administration of the enrollment of client devices 109 with the management service 130. This network site can provide administrative access to the enrollment status information for each of the client devices 109, along with user identifiers, email addresses, device identifiers, and user groups. Also, the user interface can provide a button or user interface element that can, when activated, transmit a message to a user of a client device 109, un-enroll the client device 109, or other actions. The enrollment service 150 can also use the information to provide reminders or notifications to a user of each client device 109. For example, an enterprise can request that the enrollment service 150 send reminders to client devices 109 on a certain date, after a determined time has passed, periodically, or on another schedule. Notifications or reminders to client devices 109 and users can also be sent messages by emails, texts, network sites, or applications.

The web application 151 can perform certain functions in the enrollment of the client device 109 with the management service 130. The client device 109 can access the web application 151 through a browser application 183 or another client application 175. The web application 151 can be a network site. The web application 151 can cause the browser application 183 to generate a user interface element that obtains a user-entered number, username, or other string. The user interface element can include a prompt through which the number, username, or other communication identifier can be entered. The communication identifier can be an instant messaging username, email address, telephone number, or other identifier through which the enrollment service 150 can receive communications. The communication identifier can identify a network endpoint associated with the enrollment service 150 and/or the web application 151. The communication identifier can be a telephone number that identifies a telephonic network endpoint associated with the enrollment service 150 and/or the web application 151. In some cases, the communication identifier can be a numeric identifier that appears like a telephone number (e.g., to a user), but does not identify a telephonic endpoint. The numeric identifier can be transmitted to the enrollment service 150 through instant messaging, email, or another message service.

The web application 151 can transmit a message with client data to the number associated with the enrollment service 150. The client data can include a device identifier and a device number. A device identifier can include a serial number, UDID, a MAC address, an IP address, or another identifier that uniquely identifies a client device 109 with respect to other client devices 109. The device number can be a telephone number or another identifier that can be used to call the client device 109, send an SMS message to the client device 109, or otherwise communicate with the client device 109. For example, the device number can be a telephone number that identifies a telephonic network endpoint associated with the client device 109. The web application 151 can search information in the data store 173 to identify system information associated with the client device 109 that can be used to identify the device identifier and device number of the client device 109. The web application 151 can also generate prompts in the user interface through which required information such as a username or password can be received or input. For example, the web application 151 can search the data store 173 and identify a serial number of the client device 109 and a telephone number of the client device 109. The web application 151 can further search the data store 173 to identify a user identifier, a credential, an email address, or an identity of an enterprise.

The client device 109 can, through the web application 151, receive enrollment data 144 from the enrollment service 150. For example, once client data is received by the enrollment service 150, the enrollment service 150 can update the web application 151 to provide enrollment data 144 to the client device 109. In another example, the web application 151 can determine that the client device 109 has received a message such as an SMS message from the number associated with the enterprise. The enrollment service 150 can send a message from the number to the device number. The message can include the enrollment data 144. When the client device 109 receives a message from the number, the web application 151 can intercept the message and use the enrollment data 144 to enroll the client device 109 with the management service 130. The enrollment data 144 can include an enrollment token that authenticates the client device 109 with the management service 130 during the enrollment process. The enrollment data 144 can also include a URI or other information that can be used to communicate with the management service 130. In some examples the enrollment token can be included in the URI.

The client device 109 can be representative of one or more client devices 109. The client device 109 can include a processor-based system or another computer system that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 170 that can perform functionalities and execute applications. The operating system 170 can be stored in a data store 173 that also includes client applications 175, an enrollment application 178, and other data.

The client device 109 can also be equipped with networking capability or networking interfaces, including a networking or communication capability, such as a near-field communication (NFC) capability, radio-frequency identification (RFID) read or write capability, SMS messaging capability, or other communication capability. In some embodiments, the client device 109 is mobile where the client device 109 is easily portable from one location to another.

The operating system 170 can execute various client applications 175, like an enrollment application 178, the management application 181, a browser application 183, or another application. The operating system 170 and some client applications 175 can access network content served up by the enrollment system 108, the management system 106, the previous management system 108, or other servers, thereby rendering a user interface on a display that can include a liquid crystal display (LCD), organic light emitting diode (OLED) display, touch-screen display, or other type of display device.

To this end, some client applications 175 can include a browser or a dedicated application, and a user interface can include a network page, an application screen, or other interface. The client device 109 can also access web applications using the browser application 183 that can access the web application through the network 112, which can render a user interface associated with the web application on the client device 109. Further, other client applications 175 can include device management applications, enterprise applications, social networking applications, word processors, spreadsheet applications, media player applications, or other applications.

The enrollment application 178 can be an application that performs certain functions in the enrollment of the client device 109 with the management service 130. The enrollment application 178 can generate a user interface element that accepts or obtains a user-entered number. The user interface element can include a prompt through which a number or other communication identifier can be received or input. The communication identifier can be a telephone number or other identifier associated with the enrollment service 150.

The enrollment application 178 can transmit a message with client data to the number associated with the enrollment service 150. The client data can include a device identifier and a device number. A device identifier can include a serial number, UDID, a MAC address, an IP address, or another identifier that uniquely identifies a client device 109 with respect to other client devices 109. The device number can be a telephone number or another identifier that can be used to call the client device 109, send an SMS message to the client device 109, or otherwise communicate with the client device 109. The enrollment application 178 can search information in the data store 173 to identify system information associated with the client device 109 that can be used to identify the device identifier and device number of the client device 109. The enrollment application 178 can also generate prompts in the user interface through which required information such as a username or password can be received or input. For example, the enrollment application 178 can search the data store 173 and identify a serial number of the client device 109 and a telephone number of the client device 109. The enrollment application 178 can further search the data store 173 to identify a user identifier, a credential, an email address, or an identity of an enterprise.

The enrollment application 178 can receive enrollment data 144 from the enrollment service 150. In some cases, the enrollment application 178 can determine that the client device 109 has received a message such as an SMS message from the number associated with the enterprise. For example, the enrollment service 150 can send a message from the number to the device number. The message can include the enrollment data 144. When the client device 109 receives a message from the number, the enrollment application 178 can intercept the message and use the enrollment data 144 to enroll the client device 109 with the management service 130. The enrollment data 144 can include an enrollment token that authenticates the client device 109 with the management service 130 during the enrollment process. The enrollment data 144 can also include a URI or other information that can be used to communicate with the management service 130. In some examples the enrollment token can be included in the URI.

The enrollment application 178 can also enable features or functionalities of the client device 109. For example, the enrollment application 178 can enable a network adapter such as a WiFi adapter or 802.11 device to facilitate identifying a MAC address associated with the client device 109. In some examples, a MAC address of a client device 109 might be unavailable unless the network adapter has been enabled. In this scenario, the enrollment application 178 can cause the client device 109 to enable the network adapter and identify a MAC address, IP address, or other device identifier.

Figure 2:
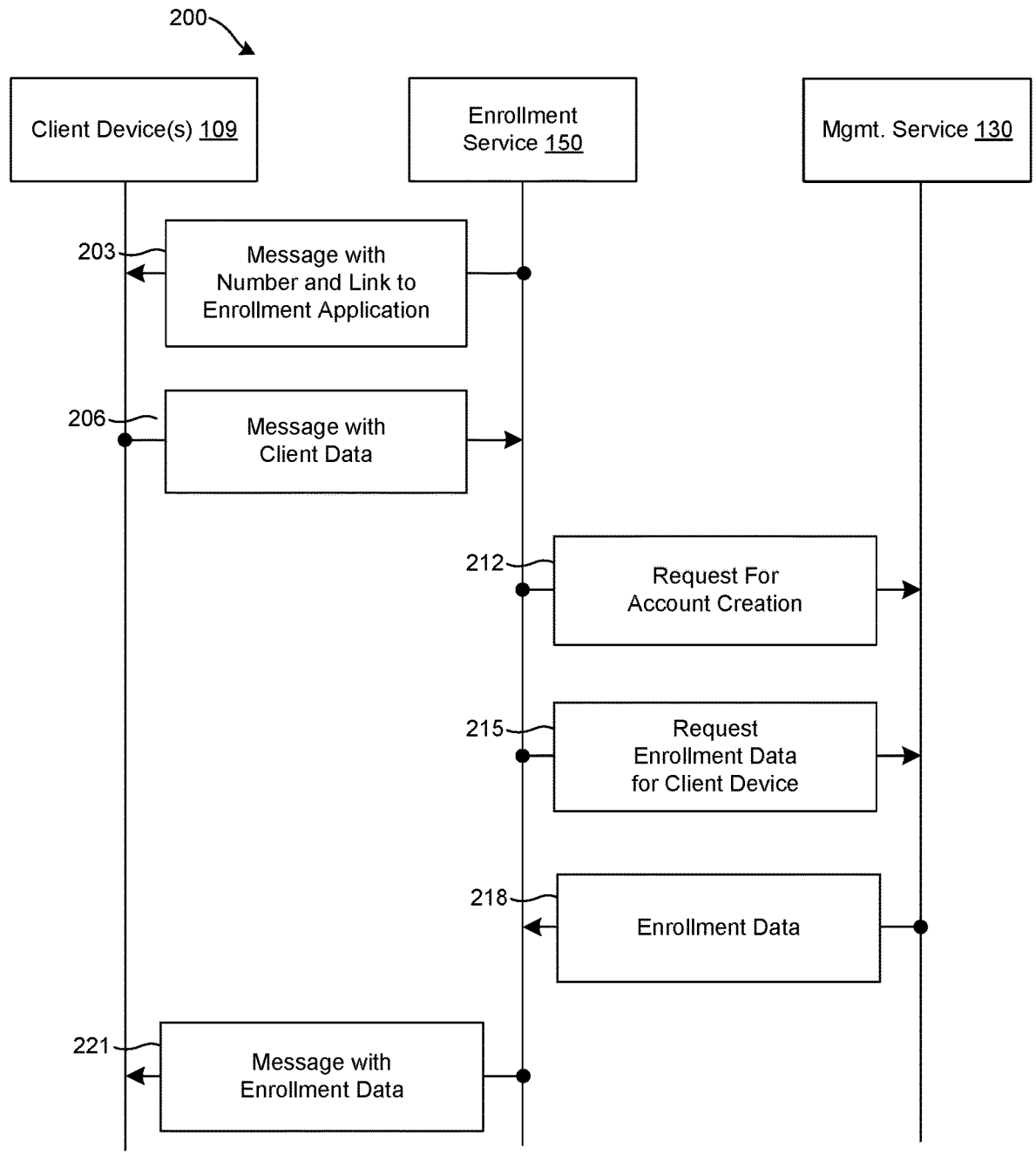
FIG. 2 is a sequence diagram that illustrates functionality implemented by components of the networked environment.

Turning now to FIG. 2, shown is a sequence diagram illustrating steps performed by components of the networked environment 100 for enrolling the client device 109 with the management service 130. Generally, the enrollment process shown in FIG. 2 involves un-enrolling the client device 109 with the management service 130 using messages such as SMS messages between the client device 109 and the enrollment service 150. In some examples, the enrollment service 150 is used in concert with the enrollment application 178 for user interaction and enrollment actions performed on the client device 109. The browser application 183 and other client applications 175 such as an email application can also be used during the enrollment process.

In step 203, the enrollment service 150 can transmit a message to the client device 109. The message can include a number, such as a telephone number, that is used by the enrollment service 150 to receive telephony or other electronic communications. The number can be associated with a particular enterprise in an enrollment map 156 stored in the data store of the enrollment system 108. The enrollment system 108 can receive messages sent to the number, for example, through an SMS gateway service. The SMS gateway service can be considered part of the network 112. The message can be sent as an SMS message, email message, or otherwise. In some cases, the enrollment service 150 does not transmit a message with the number to the client device 109. For example, a user can be given the number using a business card, a receipt, or a venue ticket. In other examples, the enterprise can communicate the number to a user through email, SMS, or in another manner.

In step 206, the enrollment application 178 on the client device can transmit a message, such as an SMS message, to the number that identifies a network endpoint of the enrollment service 150. The message can include client data associated with the client device 109. In some examples, the enrollment application 178 can search the client device 109 for a device number, a device identifier, and other client data that is stored in the data store 173. The enrollment application 178 can also generate a user interface including a user interface element that accepts a user-entered number such as the number associated with the particular enterprise. In some situations, a user can also enter the client data, the device number, the device identifier, and other client data through another user interface element of the enrollment application 178. In other situations, a user can enter the client data, the device number, the device identifier, and other client data into a native SMS or texting application and can transmit the message to the number or other communication identifier.

An enterprise or user group of the enterprise can be identified based on the number at which the enrollment service 150 receives the client data. For example, the enrollment service 150 can search the enrollment map for the number and identify that the enterprise is associated with the number within the enrollment map. The enrollment service 150 can employ multiple numbers corresponding to multiple enterprises or user groups.

In step 212, once the message that includes the client data is received by the enrollment service 150, the enrollment service 150 can transmit a request for account creation to the management service 130. The request can cause a user account to be created by the management service 130. The user account can be created in a directory that is associated with the enterprise or a user group of the enterprise. The request for account creation can include the username, the device number, the device identifier, an enterprise identifier, a group identifier, or other information to include in the user account. In one example, the management service 130 can provide an API for user account creation, and the request (e.g., an API call) can invoke the API using the enterprise identifier, the username, the device number, the device identifier, or other information as parameters within the request.

In step 215, the enrollment service 150 can also transmit a request for enrollment data 144 to the management service 130. The request for the enrollment data 144 can include the device identifier, the username, the enterprise identifier, or other information required by the management service 130. In one example, the management service 130 can provide an API for enrollment data 144, and the request invoke the API using the device identifier, the username, the enterprise identifier, or other information as parameters within the request.

In step 218, the management service 130 can transmit the enrollment data 144 to the enrollment service 150. The enrollment data 144 can include an enrollment token that can be used to authenticate the client device 109 with the management service 130 for enrollment. The enrollment data 144 can also include a URI or other information that can be used to communicate with the management service 130 for enrollment. The enrollment service 150 can receive the enrollment data 144 from the management service in response to the request. In some cases, the enrollment data 144, including the enrollment token, can be encrypted by the enrollment service 150 once received.

In step 221, the enrollment service 150 can transmit a message such as an SMS message or an instant message to the client device 109 to initiate enrollment of the client device 109 with the management service 130. For example, the enrollment service 150 can transmit the enrollment data 144 to the client device 109 using the device number. The enrollment application 178 on the client device 109 can poll or wait for the SMS message or the instant message to be received by the client device 109. Once received, the enrollment application 178 can intercept the SMS message or the instant message and use the enrollment data 144 to enroll the client device 109 with the management service 130. The enrollment application 178 can use the enrollment data 144 to enroll the client device 109 with the management service 130 (e.g., automatically). In other words, the message can cause the client device 109 to initiate the enrollment using the enrollment data 144. In some cases, the enrollment application 178 can prompt the user to accept enrollment, terms of service, and the like. In some cases, a client application 175 such as a native messaging application typically handles messages that are received by the client device 109. For example, the enrollment application 178 can override the native messaging application and handle messages received from the enrollment service 150. Where the enrollment data 144 is encrypted, the enrollment application 178 can decrypt the enrollment data 144. The enrollment application 178 can use the enrollment data 144 to enroll the client device 109 with the management service 130. For example, an enrollment token included in the enrollment data 144 can be used to authenticate the client device 109 with the management service 130 during the enrollment process.

Figure 3:
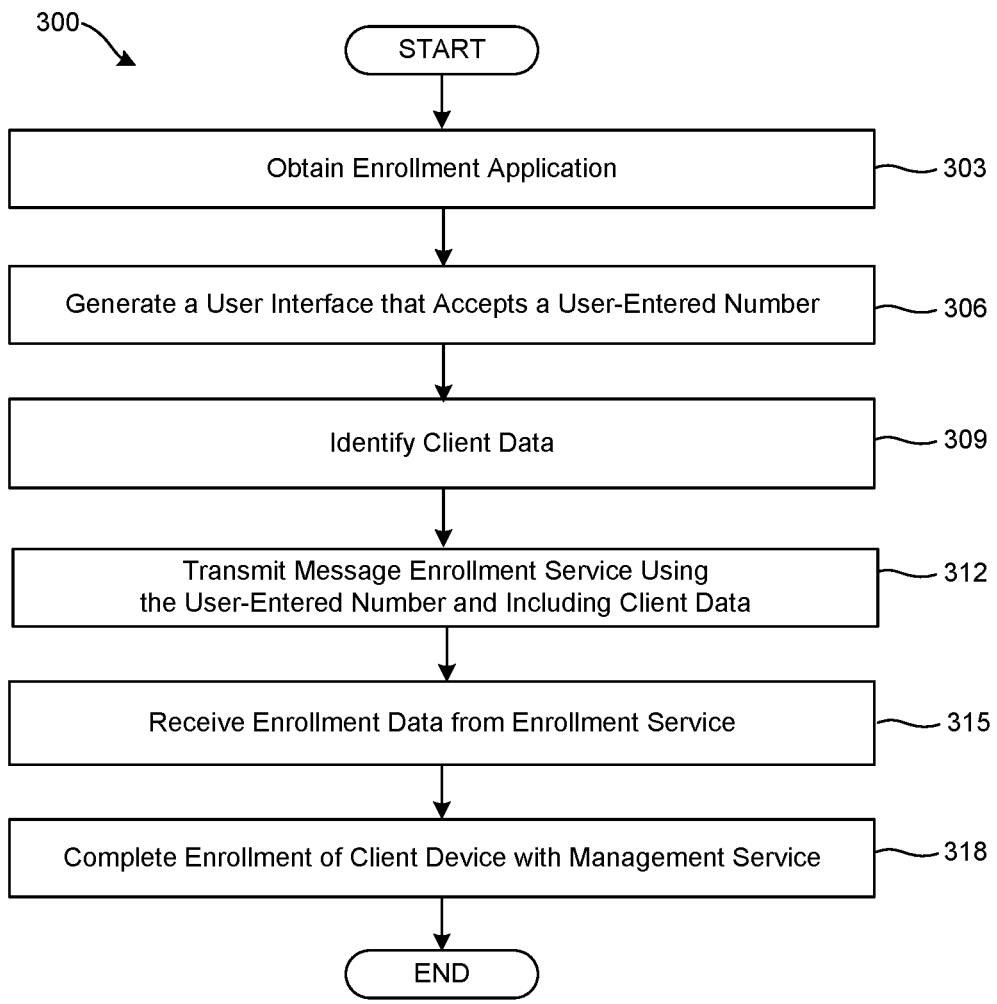
FIGS. 3-5 are flowcharts that illustrate functionality implemented by components of the networked environment.

With reference to FIG. 3, shown is a flowchart 300 that illustrates an example of the operation of the client device 109. Generally, the process shown in FIG. 3 involves enrolling the client device 109 with the management service 130 using messages such as SMS messages or instant messages. An enrollment application 178 and other client applications 175 can cause the client device 109 to perform the various steps in the flowchart 300.

In step 303, the client device 109 can obtain the enrollment application 178. The client device 109 can be obtained in a number of ways. In one example, a link to obtain the enrollment application 178 can be provided through an email message, instant message, SMS message, or another message that is accessed using the client device 109. The link can be a URI through which the client device 109 can access the enrollment application 178. In some embodiments, the message can be sent by the enrollment service 150, the management service 130, or the enterprise. In another example, the client device 109 can scan a barcode, a QR code, or another code using a native application or another client application 175. The code can be scanned from a card, receipt, or ticket, or from a screen displaying an email message, instant message, or SMS message. An imaging device such as a camera of the client device 109 can be utilized to scan the code. When scanned, the code can cause the client device 109 to access a URI or launch a client application 175 (e.g., an application store or a browser application) through which the client device 109 can access the enrollment application 178. The client device 109 can then install and launch the enrollment application 178.

In step 306, the enrollment application 178 can generate a user interface element that accepts or obtains a user-entered number. The user-entered number can be entered through a touchscreen device, a keyboard device, an audio device, or another input device of the client device 109. In some examples, the user interface can be designed to appear and operate in a manner similar to an SMS messaging application or an instant messaging application. The user-entered number can correspond to a long code, short code, DID number, MSISDN, toll-free phone number, or another number that identifies the enrollment service 150 as a network endpoint. The number can be relayed to the user face-to-face, through a card, receipt, ticket, email message, instant message, SMS message, or another manner.

In step 309, the enrollment application 178 can identify client data of the client device 109. The client data can include a device identifier, a device number, and other data. A device identifier can include a UDID, a MAC address, an IP address, or another identifier that uniquely identifies a client device 109 with respect to other client devices 109. The device number can be a long code, short code, DID number, MSISDN, toll-free phone number, or another number that identifies the client device 109 as a network endpoint. In some cases, the enrollment application 178 can search the data store 173 to identify system information including the device identifier, the device number, and other client data. Client data can also be entered by a user through a user interface element of the enrollment application 178.

In step 312, the enrollment application 178 can transmit a message that includes the client data to the enrollment service 150 using the user-entered number. For example, the enrollment application 178 can transmit a SMS message that includes the device identifier and the device number to the user-entered number. The enrollment application 178 can then poll or wait for an SMS message from the user-entered number (i.e., from the enrollment service 150) to be received by the client device 109. The enrollment service 150 can generate a username with the client data and cause the management service 130 to create a user account that includes the username, the client data, and other information as discussed further below.

In step 315, the enrollment application 178 can receive enrollment data 144 from the enrollment service 150. For example, the enrollment service 150 transmit a message using the device number of the client device 109. Once the client device 109 receives the message, the enrollment application 178 can identify that it is sent from the user-entered number. In some cases, the enrollment application 178 can intercept the message to prevent a native application of the client device 109 from handling the message. The message can include enrollment data 144. In some cases the enrollment data 144 can be encrypted, and can be decrypted by the enrollment application 178 once received.

In step 318, the enrollment application 178 can complete the enrollment of the client device 109 with the management service 150. For example, the enrollment application 178 can use an enrollment token included in the enrollment data 144 to authenticate the client device 109 with the management service 150. The enrollment application 178 can also use a URI to communicate with the management service 130 during enrollment. The URI can include the enrollment token. In some cases, the URI can specify an API of the management service 130 through which the client device 109 can be registered in association with a user account within the directory (e.g., https://host/API/v1/system/users/{username}/registerdevice).

Enrollment can be completed by causing the client device 109 to install a management profile associated with the management service 130. In some cases, the enrollment application 178 can cause a management application 181 associated with the management service 150 to be installed on the client device 109. The enrollment application 178 or the management application 181 can cause the management profile to be installed on the client device 109.

In some cases, the enrollment application 178 can present a user interface that include enrollment requirements that must be completed by the user before enrollment is completed. For example, the enrollment application 178 can present a terms of service to be accepted, or can present a prompt through which user credentials can be input before enrollment is completed. In other cases, the enrollment application 178 can cause the management profile to be installed on the client device 109 without these enrollment requirements.

Figure 4:
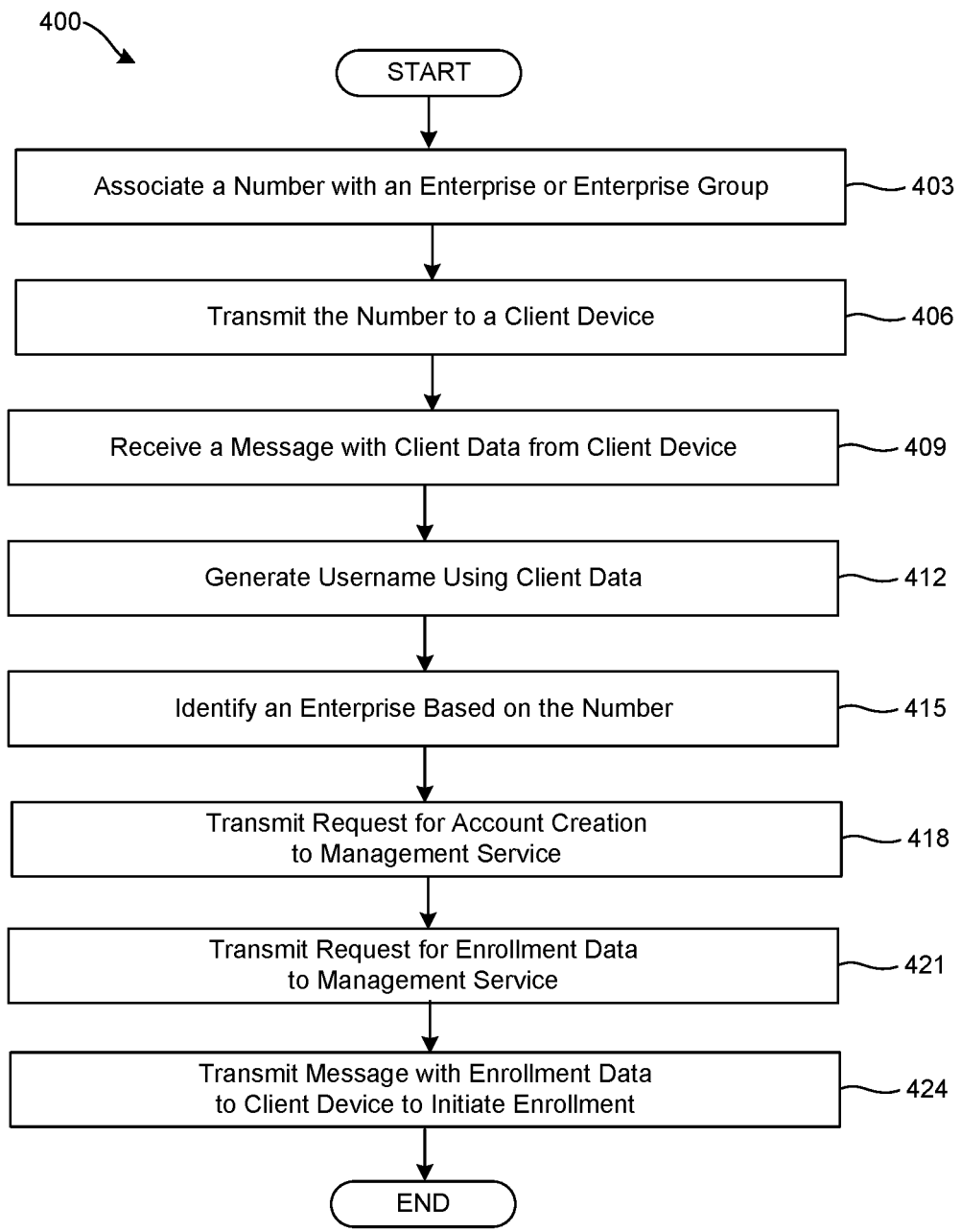

Turning to FIG. 4, shown is a flowchart 400 that illustrates an example of the operation of the enrollment service 150. Generally, the enrollment service 150 can communicate with the client device 109 using messages such as SMS messages or instant messages during the enrollment process to enroll the client device 109 with the management service 130. The enrollment service 150 can utilize the management service 130 through APIs or other network resources of the management service 130. In some cases, the enrollment service 150 can be considered a part of the management service 130.

In step 403, the enrollment service 150 can associate a number with an enterprise or user group. The enrollment service 150 can generate the enrollment map 156 and store it in the data store 153. Each number can be a long code, short code, DID number, MSISDN, toll-free phone number, or another number that identifies the enrollment service 150 as a network endpoint. The enrollment service 150 can receive messages that are sent using each number. The enrollment map 156 can be used to identify the management service 130 with which to enroll a client device 109 that sends a message using a particular number. The enrollment map 156 can include a server address of the management service 130. User groups of a management service 130 can also be stored in association with a particular number within the enrollment map 156. For example, an IT administrator of the enterprise can request that a number be provided to allow enrollment of client devices 109. The enrollment service 150 can select a number and associate the number with the enterprise or a user group of the enterprise within the enrollment map 156. The enrollment service 150 can generate the enrollment map 156 that associates the number with a group identifier or enterprise identifier within the enrollment map 156. The group identifier or enterprise identifier can be an identifier that is recognizable by the management service 130 during user account creation.

In step 406, the enrollment service 150 can transmit the number to a client device 109. The enrollment service 150 can transmit a message that includes the number to the client device 109. The message can be sent using email, SMS message, instant message, or in another manner. The email, SMS message, or instant message can also include a URI through which the enrollment application 178 can be accessed. In some situations, the enrollment service does not transmit a message that includes the number to the client device 109. The number can be communicated to a user of the client device 109 in person or using tangible objects including a card, a receipt, or a venue ticket. These tangible objects can include a barcode, QR code, or another code that includes a URI through which the enrollment application 178 can be accessed.

In step 409, the enrollment service 150 can receive a message including client data from the client device 109. The enrollment service 150 can receive the message transmitted from the client device 109 to the number. The number can identify a network endpoint of the enrollment service 150. For example, the enrollment service 150 can receive a SMS message that includes a device identifier and a device number. The SMS message can be sent to the number by the enrollment application 178. Alternatively, the enrollment service 150 can receive an instant message, email message, or another message that includes the device identifier, the device number, and other client data.

In step 412, the enrollment service 150 can generate a username using the client data. The client data can include the device identifier and the device number. The enrollment service 150 can generate the username by arranging the device identifier and the device number one after the other, or can scramble the characters of the device identifier and the device number in any order. In other cases, the enrollment service 150 can generate the username by encrypting the device identifier and the device number into an alphanumeric or character string.

In step 415, the enrollment service 150 can identify an enterprise or user group based on the number through which the message with client data is received. The enrollment service 150 can search the enrollment map 156 to identify an enterprise or user group using the number. In some cases, the enrollment map 156 includes an enterprise identifier or a group identifier that is recognizable by the management service 130 for account creation.

In step 418, the enrollment service 150 can transmit a request for account creation to the management service 130. The request for account creation can include the username, the device number, the device identifier, an enterprise identifier, a group identifier, or other information. The request can cause the management service 130 to create a user account. The user account can be created using the username, the device number, the device identifier, and other information. The user account can be associated with an enterprise or user group corresponding to the enterprise identifier or group identifier. For example, the enrollment service 150 can invoke an account creation API provided by the management service 130. The enrollment service 150 can cause a user account to be created by invoking the API using the request for account creation that includes the username. The enrollment service 150 can invoke the account creation API by transmitting the request for account creation using a URI of the API (e.g., https://host/API/v1/system/users/adduser). The username, device number, device identifier, enterprise identifier, group identifier, or other information can be parameters or values included in the request for account creation. Additional information including the enterprise identifier or the group identifier can be included in the user account by including the information in the request. In some cases, the management service 130 can provide another API that registers the client device 109 in association with the user account. The enrollment service 150 can invoke the API by transmitting a request for device registration using a URI of the API (e.g., https://host/API/v1/system/users/{username}/registerdevice). The username, device number, device identifier, enterprise identifier, group identifier, or other information can be parameters or values included in the request for device registration.

In step 421, the enrollment service 150 can transmit a request for enrollment data 144 to the management service 130. The request for the enrollment data 144 can include the device identifier, the username, or other required information. The enrollment service 150 can receive enrollment data 144 from the management service in response to the request. Once received, the enrollment service 150 can store the enrollment data 144 in a temporary record or otherwise in the data store 153. For example, the enrollment service 150 can invoke an enrollment data API provided by the management service 130. The enrollment service 150 can cause the management service 130 to transmit enrollment data 144 by invoking the API with the request that includes the device identifier, the username, or other required information. In some cases, the enrollment data 144 can include an enrollment token that can be used to authenticate the client device 109 with the management service 130 for enrollment. The enrollment token can be included in an enrollment URI.

In step 424, the enrollment service 150 can transmit a message with the enrollment data to the client device 109. For example, the enrollment service 150 can transmit a message including the enrollment data 144 to the client device 109 using the device number. The enrollment service 150 can encrypt the enrollment data 144 and include the encrypted enrollment data 144 in the message. In other cases, the management service 130 can transmit encrypted enrollment data 144 to the enrollment service 150. Once the message including the enrollment data 144 is sent to the client device, the enrollment application 178 can intercept the message and use the enrollment data 144 to enroll the client device 109 with the management service 130. Where the enrollment data 144 is encrypted, the enrollment application 178 can decrypt the enrollment data 144. Where an enrollment token is included in the enrollment data 144, the enrollment token can be used to authenticate the client device 109 with the management service 130 during the enrollment process.

Figure 5:
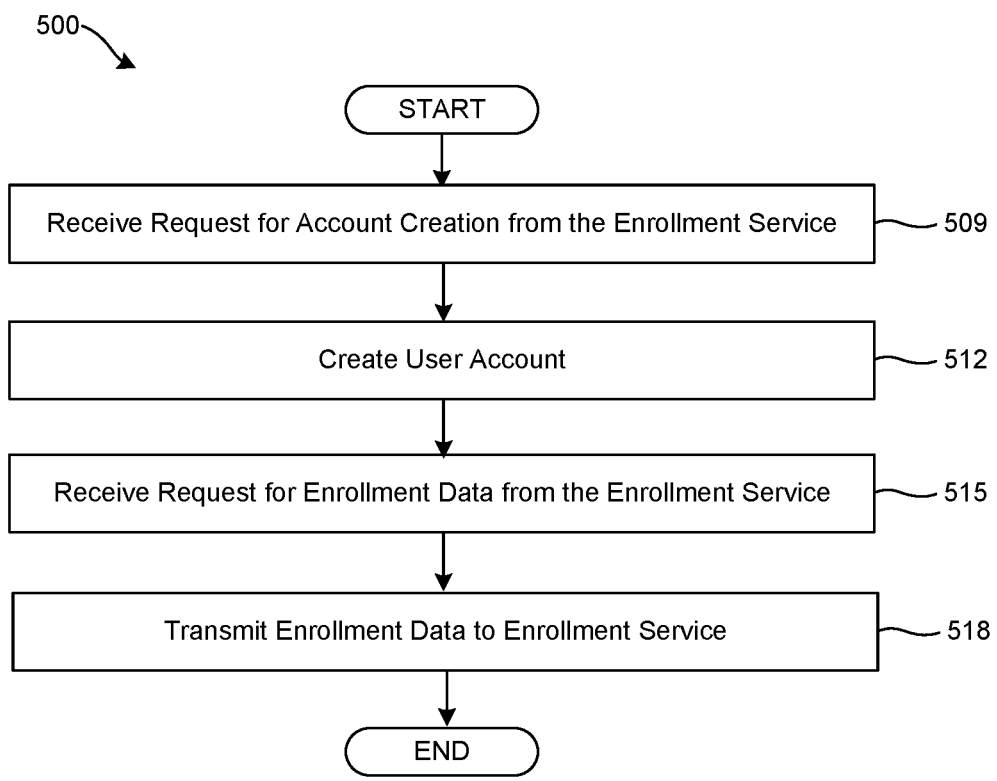

With reference to FIG. 5, shown is a flowchart 500 that illustrates an example of the operation of the management service 130. Generally, the management service 130 can provide APIs and other network resources that can be accessed by the enrollment service 150 during the enrollment process to enroll the client device 109 with the management service 130. The enrollment service 150 communicates with the client device 109 using messages such as SMS messages or instant messages. In some cases, the enrollment service 150 can be part of the management service 130.

In step 509, the management service 130 can receive a request for account creation from the enrollment service 150. The request for account creation can include a username, a device number, a device identifier, an enterprise identifier, a group identifier, or other information. For example, the management service 130 can provide one or more APIs for account creation representational state transfer (REST) API. The enrollment service 150 can invoke the API by transmitting the request for account creation using a URI of the API (e.g., https://host/API/v1/system/users/adduser). The username, device number, device identifier, enterprise identifier, group identifier, or other information can be parameters or values included in the request for account creation.

In step 512, the management service 130 can create a user account that includes the username, the device number, the device identifier, the enterprise identifier, the group identifier, or other information. In some cases, the enterprise identifier or the group identifier can cause the user account to be created in association with a corresponding enterprise or user group. In some cases, the management service 130 can provide another API that registers the client device 109 in association with the user account. The enrollment service 150 can invoke the API by transmitting a request for device registration using a URI of the API (e.g., https://host/API/v1/system/users/{username}/registerdevice). The username, device number, device identifier, enterprise identifier, group identifier, or other information can be parameters or values included in the request for device registration.

Once the client device 109 is enrolled in association with the user account, the management service 130 can provide the client device 109 with access to enterprise data 138 according to enterprise or user group.

In step 515, the management service 130 can receive a request for enrollment data from the enrollment service 150. The request for the enrollment data 144 can include the device identifier, the username, or other required information. The management service 130 can provide an API for enrollment data requests such as a REST API. The enrollment service 150 can invoke the API by transmitting the request for enrollment data using a URI of the API. The device identifier, the username, or other required information can be included as parameters or values in the request for enrollment data.

In step 518, the management service 130 can transmit enrollment data 144 to the enrollment service 150. The enrollment data 144 can be used to enroll the client device 109 with the management service 130. For example, an enrollment token included in the enrollment data 144 can be used to authenticate the client device 109 with the management service 130 during the enrollment process. The enrollment data 144 can also include a URI or other information through which the client device 109 can communicate with the management service 130. In some cases, the URI can include the enrollment token that authenticates the client device 109 with the management service 130. The management service 130 can encrypt the enrollment data 144 and transmit the encrypted enrollment data 144 to the enrollment service 150.

Figure 6A:
FIGS. 6A-C are drawings that illustrate functionality implemented by components of the networked environment and rendered on the client device.
Figure 6B:
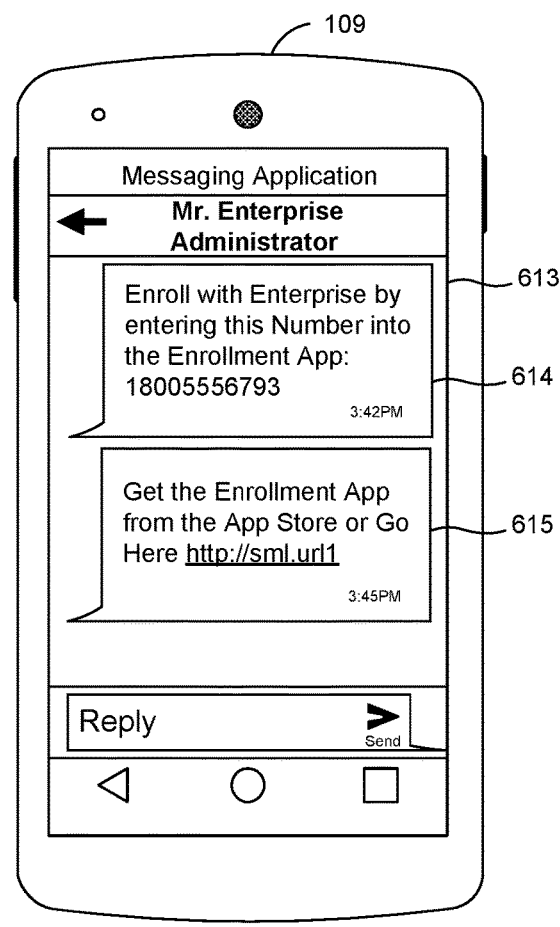

With reference to FIG. 6A, shown is an example illustration of a client device 109 executing an email application to render a user interface 603. Generally, FIG. 6B shows an example of how the number for enrollment and the enrollment application 178 can be provided to the client device 109 through email. The user interface 603 can show an email message stating "Welcome to Tech Event!" The email message can be shown in the user interface 603 as being sent from "TechEventHost@techevent.com." This can be an email address associated with an enterprise. In some examples, the email message can be sent by the enrollment service 150 for or on behalf of the enterprise so that the sender appears to be "TechEventHost@techevent.com." In other cases, the enterprise can send the email.

The user interface 603 can present instructions stating, "First Download the App, then Enter the Number Into the App to Access Tech Event Materials and WiFi." The user interface 603 can show the number "91-800-555-6792," which can be a long code, short code, DID number, MSISDN, toll-free phone number, or another number that identifies the enrollment service 150 as a network endpoint. The user interface 603 can include a button or user interface element 604. The user interface element 604 can link to or include a URI through which the enrollment application 178 can be accessed.

With reference to FIG. 6B, shown is an example illustration of a client device 109 executing an messaging application to render a user interface 613. Generally, FIG. 6B shows an example of how the number for enrollment and the enrollment application 178 can be provided to the client device 109 through messaging. The user interface 613 can show a message 614 and a message 615. The message 614 can state, "Enroll with Enterprise by entering this Number into the Enrollment App: 18005556793." The message 615 can state, "Get the Enrollment App from the App Store or Go Here," and can further provide a URI through which the enrollment application 178 can be accessed. The messages 614 and 615 can be shown in the user interface 613 as being sent from "Mr. Enterprise Administrator." This can be a user associated with an enterprise. In some examples, the messages 614 and 615 can be sent by the enrollment service 150 for or on behalf of the enterprise so that the sender appears to be "Mr. Enterprise Administrator." In other cases, the user associated with the enterprise can send the messages 614 and 615.

Figure 6C:
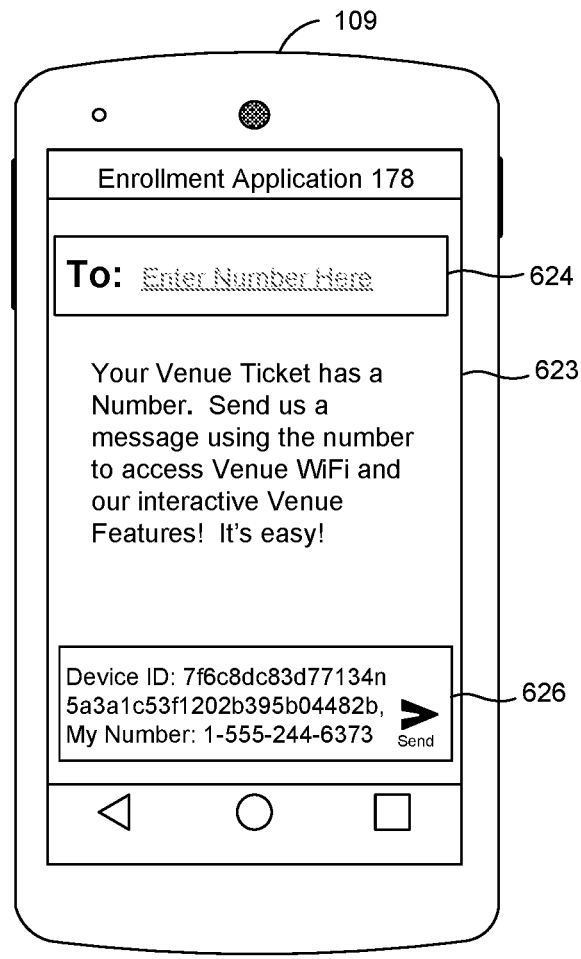

With reference to FIG. 6C, shown is an example illustration of a client device 109 executing the enrollment application 178 to render a user interface 623. Generally, this figure shows one example of how the user interface 623 the enrollment application 178 can appear and operate much like a messaging application for an end user. The enrollment application 178 can present a dialog stating "Your Venue Ticket has a Number. Send us a message to the number to access Venue WiFi and our interactive Venue Features! It's easy!" As discussed earlier, the number can be provided on tangible objects including a venue ticket, or the number can be relayed through an email, SMS message, instant message, in person, or otherwise. The enrollment application 178 can include a user interface element 624 that prompts the user to "Enter Number Here." The user interface element 624 can be designed to be familiar to users that have experience using a messaging application. The user interface element 624 can be utilized by the user to input the number.

The user interface 623 can include a user interface element 626 that when activated sends a message to the number. The number can be used by the enrollment service 150 to receive messages using the number. The message can include a device identifier, a device number, and other client data. The user interface element 626 can state, "Device ID: 7f6c8dc83d77134n5a3a1c53f1202b395b04482b, My Number: 1-555-244-6373." The "Device ID" can be a device identifier that is identified by the enrollment application 178 by searching information in the data store 173 to identify system information associated with the client device 109. "My Number," can be a device number that is similarly identified by the enrollment application 178. The user interface element 626 can indicate to the user that this information will be included in the message. In other cases, the enrollment application 178 can otherwise indicate what information will be included in the message, or can decline to indicate what information will be included in the message.

The client devices 109 or devices comprising the management system 106 and the enrollment system 108 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which user interface(s) generated by the client application(s) 175 or another application can be rendered. The client device 109 can also include one or more input/output devices that can include, for example, a capacitive touchscreen or other type of touch input device, fingerprint reader, or keyboard.

Although the enrollment service 150, management service 130, client applications 175, enrollment application 178, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show examples of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
    a client device; and
    at least one data store of the client device, the at least one data store comprising executable instructions, wherein the instructions, when executed by at least one processor, cause the client device to at least:
        generate, by an enrollment application executed on the client device, a user interface that obtains a user-entered number;
        identify, by the enrollment application, client device data comprising: a unique device identifier of the client device, and a device communication identifier that identifies the client device as a network endpoint;
        transmit, using the user-entered number, a first message to an enrollment service, the first message comprising: the unique device identifier, and the device communication identifier;
        intercept, by the enrollment application, a second message to prevent a native application of the client device from handling the second message comprising enrollment data that enables the client device to enroll with a management service, wherein the second message is intercepted by polling for messages from the user-entered number; and
        automatically enroll, by the enrollment application, the client device with the management service based on the enrollment data from the second message.

2. The system of claim 1, wherein the first message comprises an SMS message transmitted to a network endpoint of the enrollment service using the user-entered number.

3. The system of claim 1, wherein the enrollment data comprises a uniform resource identifier (URI) that specifies an enrollment token and an enrollment endpoint of the management service.

4. The system of claim 1, wherein the instructions, when executed by the at least one processor, cause at least one computing device to at least:
    identify a link to obtain the enrollment application; and
    install the enrollment application to the client device based on the link to obtain the enrollment application.

5. The system of claim 4, wherein the link to obtain the enrollment application is identified in an email message, an instant message, or an SMS message.

6. The system of claim 4, wherein the link to obtain the enrollment application is identified in response to scanning a barcode or a QR code.

7. The system of claim 1, wherein the first message is transmitted as one of: an instant message, or an email message.

8. A method implemented using instructions executed on a client device, the method comprising:
    generating, by an enrollment application executed on the client device, a user interface that obtains a user-entered number;
    identifying, by the enrollment application, client device data comprising: a unique device identifier of the client device, and a device communication identifier that identifies the client device as a network endpoint;
    transmitting, using the user-entered number, a first message to an enrollment service, the first message comprising: the unique device identifier, and the device communication identifier;
    intercepting, by the enrollment application, a second message to prevent a native application of the client device from handling the second message comprising enrollment data that enables the client device to enroll with a management service, wherein the second message is intercepted by polling for messages from the user-entered number; and
    automatically enrolling, by the enrollment application, the client device with the management service based on the enrollment data from the second message.

9. The method of claim 8, wherein the first message comprises an SMS message transmitted to a network endpoint of the enrollment service using the user-entered number.

10. The method of claim 8, wherein the enrollment data comprises a uniform resource identifier (URI) that specifies an enrollment token and an enrollment endpoint of the management service.

11. The method of claim 8, further comprising:
    identifying a link to obtain the enrollment application; and
    installing the enrollment application to the client device based on the link to obtain the enrollment application.

12. The method of claim 11, wherein the link to obtain the enrollment application is identified in an email message, an instant message, or an SMS message.

13. The method of claim 11, wherein the link to obtain the enrollment application is identified in response to scanning a barcode or a QR code.

14. The method of claim 8, wherein the first message is transmitted as one of: an instant message, or an email message.

15. A non-transitory computer-readable medium embodying executable instructions, wherein the instructions, when executed by at least one processor, cause a client device to at least:
    generate, by an enrollment application executed on the client device, a user interface that obtains a user-entered number;
    identify, by the enrollment application, client device data comprising: a unique device identifier of the client device, and a device communication identifier that identifies the client device as a network endpoint;
    transmit, using the user-entered number, a first message to an enrollment service, the first message comprising: the unique device identifier, and the device communication identifier;
    intercept, by the enrollment application, a second message to prevent a native application of the client device from handling the second message comprising enrollment data that enables the client device to enroll with a management service, wherein the second message is intercepted by polling for messages from the user-entered number; and automatically enroll, by the enrollment application, the client device with the management service based on the enrollment data from the second message.

16. The non-transitory computer-readable medium of claim 15, wherein the first message comprises an SMS message transmitted to a network endpoint of the enrollment service using the user-entered number.

17. The non-transitory computer-readable medium of claim 15, wherein the enrollment data comprises a uniform resource identifier (URI) that specifies an enrollment token and an enrollment endpoint of the management service.

18. The non-transitory computer-readable medium of claim 15, wherein the instructions, when executed by the at least one processor, cause at least one computing device to at least:

identify a link to obtain the enrollment application; and
install the enrollment application to the client device based on the link to obtain the enrollment application.

19. The non-transitory computer-readable medium of claim 18, wherein the link to obtain the enrollment application is identified in an email message, an instant message, or an SMS message.

20. The non-transitory computer-readable medium of claim 18, wherein the link to obtain the enrollment application is identified in response to scanning a barcode or a QR code.

* * * * *